United States Patent
Warkentin

Patent Number: 5,829,190
Date of Patent: Nov. 3, 1998

[54] GRAPE DRYING METHOD

[76] Inventor: Robert K. Warkentin, 2834 S. Kent, Visalia, Calif. 93277

[21] Appl. No.: 749,924

[22] Filed: Nov. 15, 1996

Related U.S. Application Data

[62] Division of Ser. No. 437,166, May 8, 1995, Pat. No. 5,666,761.

[51] Int. Cl.⁶ .............................. A01C 1/00; A01B 79/00
[52] U.S. Cl. ........................................ 47/58; 47/46; 47/44
[58] Field of Search ................................... 47/46, 44, 47, 47/45, 58; 211/119.01

[56] References Cited

U.S. PATENT DOCUMENTS 463,441   11/1891   Cox ..................................... 211/119.01

FOREIGN PATENT DOCUMENTS

| | | | |
|---|---|---|---|
| 2644669 | 9/1990 | France ..................................... 47/62 C |
| 212 879 | 8/1984 | Germany ................................. 47/46 R |
| 405-153876 | 6/1993 | Japan ....................................... 47/58 T |
| 0895357 | 1/1982 | U.S.S.R. ................................. 47/46 R |
| 1586608 | 8/1990 | U.S.S.R. ................................. 47/46 R |
| 1754013 | 8/1992 | U.S.S.R. ................................. 47/46 R |

*Primary Examiner*—Michael J. Carone
*Assistant Examiner*—Joanne C. Downs
*Attorney, Agent, or Firm*—Lyon & Lyon LLP

[57] ABSTRACT

A method for drying grapes from a vineyard using vertical supports extending above the rows of grapevines and porous horizontal trays extending above the grapevines along each row supported by the vertical supports. A black plastic porous tray material defines the trays which stretch between parallel wires supported by a periodic structure for spreading the wires. The tray material may be wrapped about the wires at its outer edges and held by synthetic materials which adhere when pressed together.

4 Claims, 1 Drawing Sheet

GRAPE DRYING METHOD

This application is a divisional of Ser. No. 08/437,166 filed May 8, 1995 U.S. Pat. No. 5,666,761.

BACKGROUND OF THE INVENTION

The field of the present invention is agricultural systems for drying grapes and related vine products.

Grapes have long been cultivated for the production of raisins. Vineyards are typically laid out in rows of grapevines which are spaced apart and oriented for tractor access and for conducting the raisin making process. The vines are arranged with grape stakes periodically placed along each row. The grape stakes extend vertically and support one or more wires extending along the row. The wires support the vines during the growing season.

In preparation for the harvest, the areas between the rows are planed smooth. Square sheets of paper called trays are laid out on the planed areas. The workers then manually cut bunches of grapes and place them on the trays. After several days, the grapes are turned on the trays to insure complete drying. Once dried, the trays are folded up so as to retain the raisins and transported from the field.

The described process has certain drawbacks. Of greatest concern is the weather. During the critical drying process, any significant precipitation can destroy the product. If allowed to become sufficiently wet, the product will become moldy. Entire crops can be ruined by the rain in this way.

Certain disadvantages to the process are realized because the trays are placed on the ground and between the rows of vines. The foregoing problem with moisture is aggravated with the trays on the ground. A significant amount of dirt and sand can become intermixed with the raisins, resulting in the need for a greater and more costly cleaning operation. The rows are typically oriented in an East/West direction to capture the greatest amount of sunshine on the ground between rows. The rows are also further apart from one another for the same reason. The added cost of preparing the area between the vines with planing is a necessary additional expense in preparation for placement of the trays on the ground. Even with the preparation, a significant amount of products can be lost because of grapes rolling off the paper trays.

The lack of automation in this process also inhibits efficient operation. Significant labor costs are incurred in the planing, placing of the trays, placing harvested grapes on the trays, turning the grapes and gathering the raisins. The work is very laborious and physically challenging.

SUMMARY OF THE INVENTION

The present invention is directed to a method for drying grapes which includes elevated porous trays. Harvested grapes are placed on a porous horizontal mesh tray supported above the ground. The grapes are later removed when they are dried to raisins. The tray material provides an appropriate environment for drying raisins even with otherwise devastating moisture.

Thus, it is an object of the present invention to provide an improved method for the manufacture of raisins from grapes. Other and further objects and advantages will appear hereinafter.

DETAILED DESCRIPTION OF THE PREFERRED EMBODIMENT

Figure 1:
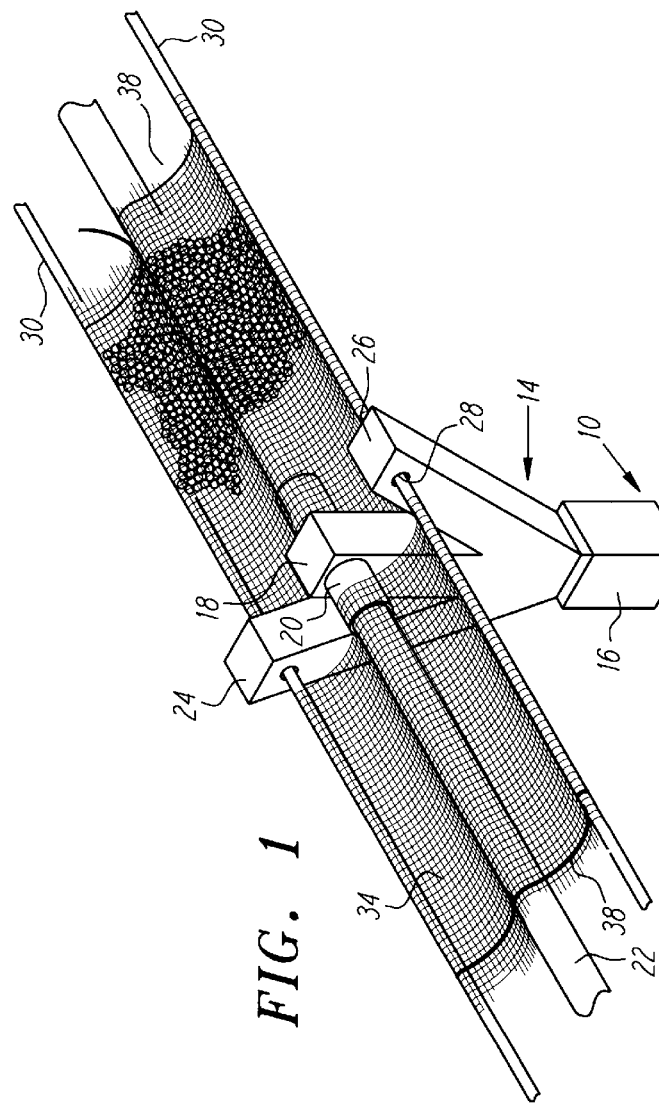
FIG. 1 is a perspective view of a grape drying system.
Figure 2:
FIG. 2 is a side view of the grape drying system of FIG. 1 with a nonporous sheet overlying the porous trays.

Turning in detail to the drawings, a system for drying grapes is illustrated. A vertical support 10 is illustrated as including a traditional grape stake 12 which may or may not be simultaneously employed to support the conventional wires used to support the vines during the growing season. Atop the grape stake 12 is a molded plastic attachment support 14. The grape stake 12 and the attachment support 14 defining the vertical support 10 extend upwardly from the ground to a point above the anticipated growth of the grapevines during a season.

The attachment support 14 may take on any convenient shape but is designed to attach to the grape stake 12 and to support trays extending between each vertical support 10. A socket 16 is defined at one end of the attachment support to slip over the end of the grape stake 12. A central post 18 extends upwardly from the socket 16. A tubular sleeve 20 extends from each side of the central post 18 to receive poles 22 extending from adjacent vertical supports 10. The poles may be of PVC pipe of sufficient wall thickness and diameter to accommodate the weight of grapes in the supported tray.

In constructing the foregoing structure, the grape stakes are preferably placed at uniform spaces along a row of grapevines. The supporting structure on the grape stakes 12 may then be assembled by placing a first attachment support 14 on a grape stake 12 at one end of the row of grapevines. A pole 22 acting as a first support element may then be inserted in the tubular sleeve 20 associated with that first attachment support 14. A second attachment support 14 on the next adjacent grape stake 12 is then positioned by first placing the tubular sleeve 20 around the pole 22 and then placing the socket 16 down on the second grape stake 12. Using this construction and method of attachment, there can be significant tolerance between the grape stakes 12 and yet the structure can accommodate a secure placement of each of the poles 22.

Side posts 24 and 26 are also formed in this embodiment as part of the attachment support 14. These side posts 24 and 26 include holes 28 for receipt of wires 30 the wires acting as second and third support elements. The holes 28, in other embodiments, may be replaced by slots, with or without locking devices, to retain the wires 30 in the event that the wires 30 are preferably disassociated with the support 14 without undue difficulty. The wires 30 are drawn taut to minimize any sagging. A convenient mechanism for maintaining tension is to extend each wire 30 downwardly to a stake 32. Conventional tensioning mechanisms such as a turnbuckle may be used.

Porous horizontal trays 34 are arranged on the foregoing structure. Black plastic porous cloth material of the type used for partial shade is contemplated. Such material is typically of nylon and is a mesh fabric. The trays 34 extend between the wires 30. Any one of a number of mechanisms may be employed to retain the trays 34 on the wires 30. One such mechanism for retaining the tray material in place is synthetic materials which adhere when pressed together such as VELCRO. Complementary strips of material are arranged in parallel adjacent to one another along the edges of the tray material 34. The tray material is folded over a wire such that the two strips adhere to one another. Hooks, grommets and the like may also be used for attachment to the wires 30.

The tray material 34 may be arranged to extend various lengths. The material may extend between grape stakes 12 or along a complete row without break. In the event that it may be of interest to remove the material when not in use, a roller assembly 36 at one end of the row may be conveniently mounted to accept rollers for rolling up the tray material 34.

The black plastic porous tray material 34 is intended for long term utility. The interstices in the cloth are preferably large enough to avoid retention of water and at the same time too small for grapes or raisins to fall through. The material must be rugged as significant weight is contemplated.

To assist in retaining the tray 34 spread open, intermediate spreaders 38 may be arranged. These spreaders 38 can be of spring wire extending between the wires 30 and preferably engaging the poles 22.

A sheeting material 40 may also be arranged with the drying system. The sheeting material 40 is preferably of clear plastic able to transmit light. The material 40 is contemplated to be arranged on top of the porous tray material 34. This material may be stowed on rollers used on the roller assembly 36 and drawn out when appropriate such as with impending rain. The same or separate roller assemblies 36 may be used for the separate trays 34 and cover sheeting 40. If the appropriate material is selected, it may be possible to simply leave the material in place throughout the drying. Fasteners may also be employed along the length of each side of the sheeting material 40 for retention on the trays 34.

To utilize the drying system, the grapes may be manually placed and the raisins manually removed. However, a more efficient system would be to include a portable lift which moves along with the pickers. The picked grapes would be positioned on the lift and a belt or other lifting mechanism would convey the product onto the trays. Once dried, a portable vacuum system could be used to quickly remove the raisins, stems and the like from the trays.

The foregoing system is contemplated to be used to advantage in laying out a vineyard. The area between rows of vines may be left fallow. The rows may be close together and oriented to better match topography and convenience. Automation of the harvesting and treating process may also be more applicable with the continuous and easily located trays. Finally, the tray material provides an appropriate environment for drying raisins even with otherwise devastating moisture. The black color and the porosity may also accelerate the drying process.

Thus, a new drying system for vine products is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A method for drying grapes from a vineyard with grape vines extending in rows, comprising harvesting grapes from at least one row of grape vines;

placing the grapes on a porous horizontal mesh tray supported above the at least one row of grape vines;

removing the grapes from the porous horizontal mesh tray after the grapes have dried.

2. A method for drying grapes from a vineyard with grape vines extending in rows, comprising supporting a porous mesh above the ground at the rows of grape vines;

supporting the porous mesh in a substantially horizontal configuration;

harvesting grapes from the grape vines;

placing the grapes on the porous mesh supported above the ground at the rows of grape vines;

removing the grapes from the porous mesh after the grapes have dried.

3. The method of claim 2, wherein supporting the porous mesh includes attaching the porous mesh to two parallel taut wires to either side and above a row of grape vines.

4. The method of claim 3, wherein supporting the porous mesh further includes placing a pole parallel to and between the wires and beneath the porous mesh.

* * * * *